United States Patent
Schettler

[15] 3,698,726
[45] Oct. 17, 1972

[54] DEVICE FOR SEALING AND LUBRICATING RECIPROCATING MACHINE MEMBERS

[72] Inventor: Kurt Schettler, Erlangen, Germany

[73] Assignee: Siemens Aktiengesellschaft, Erlangen, Munchen, Germany

[22] Filed: Oct. 8, 1970

[21] Appl. No.: 79,009

[30] Foreign Application Priority Data

Aug. 6, 1970 Germany........P 20 39 071.0

[52] U.S. Cl..................................277/125, 277/216
[51] Int. Cl..............................................K16j 15/18
[58] Field of Search..277/123, 125, 216, 157, DIG. 6

[56] References Cited

UNITED STATES PATENTS

| 3,272,520 | 9/1966 | Woolfenden | 277/216 X |
| 3,076,659 | 2/1963 | Kremer | 277/157 X |
| 3,097,990 | 7/1963 | Holly | 277/DIG. 6 |

Primary Examiner—William F. O'Dea
Assistant Examiner—Robert I. Smith
Attorney—Curt M. Avery, Arthur E. Wilfond, Herbert L. Lerner and Daniel J. Tick

[57] ABSTRACT

A device for sealing and molecularly lubricating a reciprocating machine member for moving liquids has a stuffing box packing having a plurality of spaced packing rings disposed tightly around the periphery of the reciprocating machine member and is comprised of polytetrafluoroethylene and a fiber mesh. Also provided are a plurality of intermediate rings made of textile mesh hardened with synthetic resin and disposed around the member. Each of these intermediate rings is positioned between a pair of next-adjacent packing rings and has an inner surface bordering the member. The inner surface of each of the intermediate rings is provided with an annular groove. A slit-like passage extends laterally through the respective packing rings for accommodating a flow of the liquid moved by the member, whereby the groove of each of the intermediate rings fills with the liquid for providing a continuous lubrication of the member.

4 Claims, 3 Drawing Figures

PATENTED OCT 17 1972 3,698,726
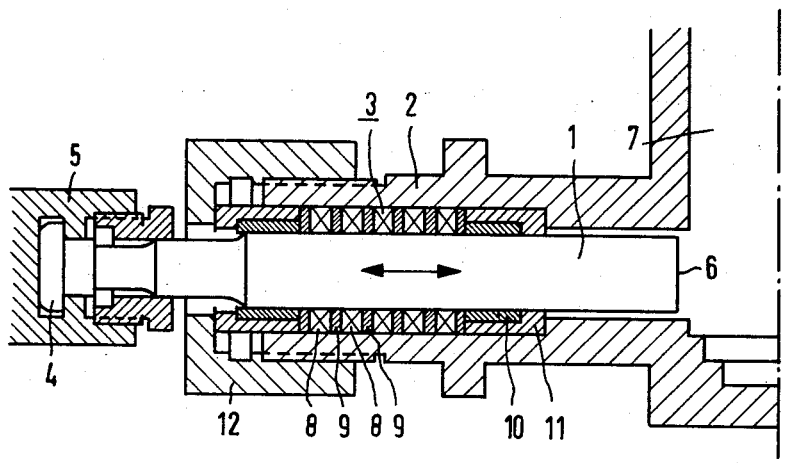
Fig. 1
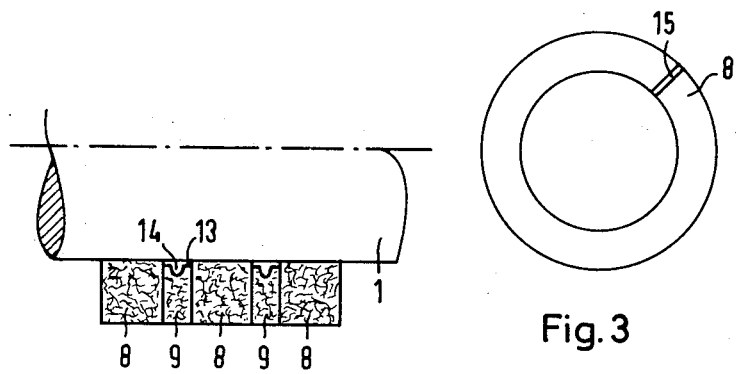
Fig. 2
Fig. 3

DEVICE FOR SEALING AND LUBRICATING RECIPROCATING MACHINE MEMBERS

My invention relates to a device for sealing and lubricating reciprocating machine members, and more particularly such a device which includes means for providing a continuous lubrication of the reciprocating member.

It is known practice to seal reciprocating machine members against the housing within which such members are disposed and the outer atmosphere with stuffing box seals, for example in the case of a piston pump by sealing the plunger through against the cylinder housing. In this connection, a stuffing box leakage of several liters per hour is permissible and is absolutely necessary to secure lubrication and cooling of the plunger. A stuffing box seal arrangement related to the device of the instant invention is disclosed in my U.S. Pat. application Ser. No. 3793 entitled, "Sealing and Lubricating Device for Piston Pump Plunger," filed Jan. 19, 1970 and assigned to the assignee of the instant invention.

When the above type of piston pumps are used in nuclear reactors for moving, for example radioactive liquids such as heavy water containing tritium, a stuffing box leakage of several liters per hour is too high by a considerable amount. In such a case, there must be provided a good sealing by the stuffing box packing on the one hand while on the other hand providing a safe and sure lubrication of the packing, so that a stuffing box leakage of less than one liter per day is not exceeded. Special difficulties arise in this connection because of the required purity of the moved medium, no special lubricating means may be used for the plunger, instead the medium moved by the pump must itself be used as a lubricating and cooling means and because of its purity this medium has a very small viscosity and therefore practically no lubricating action.

It is an object of my invention to provide a device for sealing and lubricating a reciprocating machine member.

It is another object of my invention to provide a device for sealing a reciprocating machine member for moving liquids which simultaneously provides the required lubrication to the member to obviate the occurrence of a prohibitively high heating and burning of the packing portion of the device.

In accordance with the invention, a device for sealing and molecularly lubricating a reciprocating machine member for moving liquids comprises a stuffing box packing having a plurality of spaced packing rings disposed tightly around the periphery of the reciprocating machine member; these packing rings are comprised of polytetrafluoroethylene and a fiber mesh. A plurality of intermediate rings made of textile mesh hardened with synthetic resin are disposed around the member. Each of the intermediate rings is positioned between a pair of next-adjacent packing rings and has an inner surface bordering the member. Each of the intermediate rings is provided with a substantially annular groove formed on the inner surface thereof. A slip-like passage extends laterally through the respective packing rings for accommodating a flow of the liquid moved by the member, whereby the groove of each of the intermediate rings fills with the liquid for providing a continuous lubrication of the member.

By means of the above-described form of the packing, there is provided a small passage of the pumped medium to the total surface of the reciprocating machine member and therewith an insurance that a prohibitively high heating and burning of the packing elements will not occur. The molecular lubrication occurring as a consequence of the foregoing is especially essential with the mentioned materials that are pumped, these materials having a low viscosity and being without a natural lubricating capacity.

The invention will now be described with reference to the accompanying drawing, wherein FIG. 1 is a longitudinal sectional view of a plunger provided with sealing and packing elements as required by the invention;

FIG. 2 is a cutaway view, partially in section, of the sealing and lubricating portions of the invention; and FIG. 3 is a sectional view of one of the packing elements provided with a slit-like passage according to a feature of the invention.

Referring to FIG. 1, the plunger 1 of a piston pump is positioned within the stuffing box packing 3 held in the cylinder housing 2. The left end of the plunger 1 is connected to drive 5 by a cross head 4. By means of the right end of the plunger 6 the medium to be pumped is pumped upwardly from below through the pumping house 7 by valves not illustrated in the drawing.

The stuffing box packing is comprised of individual packing rings 8 of the so-called soft-packing type made of a mesh of mineral and/or textile fiber jacketed with polytetrafluoroethylene (Teflon). These soft packing rings lie tight on the plunger surface and offer a high guarantee for the sealing effect of the packing. Between these individual soft packing rings 8, are provided intermediate rings made of a textile mesh and hardened with synthetic resin plastic (Novotex). Each of the intermediate rings is positioned between a pair of next-adjacent packing rings. These intermediate rings are adapted to the plunger so as to have a radial tolerance of less than one (1) mm. at the interface of the surface of the plunger and the inner surface of the rings. In addition, the inner surface of the intermediate rings is provided with a substantially annular groove.

To ensure a molecular lubrication of the plunger and according to a feature of the invention, the soft packing rings 8 are provided with respective substantially radial slits 15, as illustrated in FIG. 3 so that a small leakage of the pumping medium is afforded, the pumping medium itself serving as the lubrication medium. The slits 15 can have any desired position, for example, they can be diagonal with respect to the radius or step-wise; there need only be provided a passage for conducting fluid in axial direction. The pump medium that flows through these slits 15 fills the grooves 14 in the intermediate ring 9 thereby achieving a continuous wetting and cooling of the plunger surface. A small tolerance between the intermediate ring 9 and plunger 1 is required so that no deposits of the relatively hard material of the intermediate ring rub off on the plunger.

The packing rings 8 and intermediate rings 9 are held at both ends by the bearing rings 10 and the sealing rings 11 safe in the cylinder housing, the sealing rings 11 being made of synthetic material for the most part and surrounding the bearing rings 10. The clamping sleeve 12 screwed to the free end of the cylinder housing presses the assembly together as well as serving for adjustment purposes.

FIG. 2 illustrates a cut-away section of the sealing with a portion of the plunger 1, the soft packing rings 8 and the intermediate rings 9. This view especially illustrates how the packing rings 8 lie tight against the plunger 1 because these rings have a high gliding capacity because of the material used, whereas the intermediate rings 9 are formed with a small tolerance at the flank portions 13 of the groove 14 with respect to the plunger 1.

Because the spacing of the intermediate rings 9 in axial direction between the packing rings 8 is relatively small, a dry running of the plunger within the packing is prevented because of the grooves 14 filled with liquid. In addition, tolerances and openings in the packing rings and intermediate rings are so small that the leakage is held to a minimum. In this way, a prohibitively high heating with the associated burning of the packing is prevented as well as an unwanted sudden breakthrough of the pumping medium caused by such a burning of the packing. Instead an adequate cooling of the plunger and a tight sealing of the packing against leakage of liquid is guaranteed.

To those skilled in the art it will be obvious upon a study of this disclosure that the invention permits various modifications with respect to structural details and hence may be given embodiments other than illustrated and described herein, without departing from the essential features of the invention and within the scope of the claims annexed hereto.

I claim:

1. Device for sealing and molecularly lubricating the plunger member of a piston pump for moving liquids of low viscosity, comprising a stuffing box packing having a plurality of spaced packing rings disposed tightly around the periphery of the plunger member and being comprised of polytetrafluoroethylene and a fiber mesh, a plurality of intermediate rings made of textile mesh hardened with synthetic resin and disposed around said member, each of said intermediate rings being positioned between a pair of next-adjacent packing rings and having an inner surface bordering said member, each of said intermediate rings having a substantially annular groove formed on the inner surface thereof, and slit-like passage means extending laterally through said packing rings for accommodating a flow of the liquid moved by said member, whereby said groove of each of said intermediate rings fills with said liquid for providing a continuous lubrication of said member.

2. In a device according to claim 1, said intermediate rings being adapted to said member so as to have a radial tolerance of less than 0.3mm at the interface of the surface of said member and said inner surface of said rings.

3. In a device according to claim 1, said slit-like passage means comprising a plurality of slits extending substantially radially through said packing rings respectively.

4. In a device according to claim 1, said fiber mesh of said packing rings being at least one material, selected from the group consisting of textile fiber mesh and mineral fiber mesh.

* * * * *